US008508540B2

(12) United States Patent
Porwal (10) Patent No.: US 8,508,540 B2
(45) Date of Patent: Aug. 13, 2013

(54) RESONANT INDUCTION TO POWER A GRAPHICS PROCESSING UNIT

(75) Inventor: Gunjan Porwal, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 1070 days.

(21) Appl. No.: 12/499,112

(22) Filed: Jul. 8, 2009

(65) Prior Publication Data

US 2011/0006610 A1    Jan. 13, 2011

(51) Int. Cl.
*G06F 13/14* (2006.01)
*G06F 15/00* (2006.01)
*H04B 5/00* (2006.01)

(52) U.S. Cl.
USPC ................... 345/520; 345/501; 455/41.1

(58) Field of Classification Search
None
See application file for complete search history.

(56) References Cited

U.S. PATENT DOCUMENTS

| | | | | |
|---|---|---|---|---|
| 6,211,799 B1* | 4/2001 | Post et al. | ................ | 341/33 |
| 7,562,245 B1* | 7/2009 | Cai et al. | ................ | 713/500 |
| 8,092,251 B2* | 1/2012 | Rosenblatt | ................ | 439/536 |
| 2008/0021525 A1* | 1/2008 | Solzbacher et al. | ........... | 607/61 |
| 2010/0083012 A1* | 4/2010 | Corbridge et al. | ........... | 713/300 |
| 2010/0201310 A1* | 8/2010 | Vorenkamp et al. | ......... | 320/108 |
| 2010/0256831 A1* | 10/2010 | Abramo et al. | .............. | 700/292 |

* cited by examiner

*Primary Examiner* — Joni Richer
(74) *Attorney, Agent, or Firm* — Raj Abhyanker, P.C.

(57) ABSTRACT

A method, system and an apparatus of resonant induction to power a graphics processing unit (GPU) are disclosed. In one embodiment, a resonant induction system is described. The resonant induction system includes a transmitter circuit tuned to a resonant frequency. The transmitter circuit generates a non-radiative magnetic field when a control current is passed through the transmitter circuit. The resonant induction system also includes a receiver circuit, resonantly coupled to the non-radiative magnetic field generated by the transmitter circuit, and tuned to the resonant frequency of the transmitter circuit. The receiver circuit is located in a GPU. The transmitter circuit and the receiver circuit are resonantly coupled to each other at the resonant frequency. A control current source supplies the control current to the transmitter circuit. A feedback module may be communicatively coupled to the GPU to determine a power requirement of a particular computer graphics application.

13 Claims, 5 Drawing Sheets

RESONANT INDUCTION TO POWER A GRAPHICS PROCESSING UNIT

FIELD OF TECHNOLOGY

This disclosure relates generally to a power source of an electronic device and, more particularly, to a system, an apparatus, and a method of resonant induction to power a graphics processing unit.

BACKGROUND

A graphics processing unit (GPU) (e.g. NVIDIA Tesla™ GPU)) may require power to operate. The power may be supplied by a power supply external to the GPU. The power supply may be coupled to the GPU via a wired connector. The wired connector may include several connecting pins. During installation of the wired connector, a connecting pin may be incorrectly connected to an interface of the GPU. Consequently, the GPU may not receive sufficient power to operate.

Furthermore, the wired connector may occupy connecting points on the GPU that may be used for other applications.

SUMMARY

A system, an apparatus and a method of resonant induction to power a graphics processing unit (GPU) are disclosed.

In one aspect, a resonant induction system is described. The resonant induction system includes a transmitter circuit tuned to a resonant frequency. The transmitter circuit generates a non-radiative magnetic field when a control current is passed through the transmitter circuit. The resonant induction system also includes a receiver circuit, resonantly coupled to the non-radiative magnetic field generated by the transmitter circuit, and tuned to the resonant frequency of the transmitter circuit. The receiver circuit is located in a GPU. The transmitter circuit and the receiver circuit are resonantly coupled to each other at the resonant frequency. A control current source supplies the control current to the transmitter circuit. A feedback module may be communicatively coupled to the GPU to determine a power requirement of the GPU while executing a particular computer graphics application. A current control module communicatively coupled to the feedback module may set the control current value according to the power requirement of the particular computer graphics application provided by the feedback module.

The receiver circuit may provide an induced current to a component of the GPU. The resonant induction system may include a feedback module communicatively coupled to the GPU to determine a power requirement of the GPU. The resonant induction system may also include a current control module communicatively coupled to the feedback module to set the control current value according to the power requirement provided by the feedback module. The receiver circuit may include a single-layer solenoid and a capacitor. The capacitance of the capacitor may be mechanically modified to tune the receiver circuit to the resonant frequency. The transmitter circuit may modify the resonant frequency of the non-radiative magnetic field according to a control current value.

The resonant frequency of the transmitter circuit and the receiver circuit may be related according to the equation:

$$f = \frac{1}{2\pi\sqrt{L_T C_T}} = \frac{1}{2\pi\sqrt{L_R C_R}}$$

where 'f' represents the resonant frequency, '$L_T$' represents a transmitter circuit inductance, '$C_T$' represents a transmitter circuit capacitance, '$L_R$' represents a receiver circuit inductance, and '$C_R$' represents a receiver circuit capacitance. The resonant induction system may include one or more receiver circuits resonantly coupled to the non-radiative magnetic field. Each receiver circuit may resonate at a different resonant frequency. The resonant induction system may also include a switch circuit of the GPU to couple a particular receiver circuit of the plurality of receiver circuits to a particular component of the GPU as a function of the power requirement of the particular computer graphics application. The current control module may modify the waveform of the control current to any of a rectangular waveform and/or transient waveform.

In another aspect, a GPU includes a graphics processor, a receiver circuit and a power distribution module. The receiver circuit provides an induced current when resonantly coupled to a non-radiative magnetic field. The power distribution module distributes the induced current to graphics processor. The feedback module may determine a power requirement of the graphics processor.

The feedback module may render a signal that includes an information of the power requirement determined by the feedback module. The receiver circuit may include one or more capacitors. Capacitance of the capacitors may be varied to modulate a receiver circuit resonant frequency according to a non-radiative magnetic field resonant frequency. In yet another aspect, a method is disclosed. The method includes providing a GPU. The method includes obtaining a design parameter of a receiver circuit according to a range of power used by GPU. The method also includes coupling with a resonant receiver circuit with a non-radiative magnetic field. The non-radiative magnetic field mediates a power transfer by causing an induced current in the resonant receiver circuit.

The method may include obtaining a solenoid design parameter of a single-layer solenoid of the resonant receiver circuit to resonantly couple the resonant receiver circuit to the non-radiative magnetic field. In addition, the method may include obtaining a capacitor design parameter of a capacitor of the resonant receiver circuit to resonantly couple the resonant receiver circuit to the non-radiative magnetic field.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, system and an apparatus of resonant induction to power a graphics processing unit (GPU) are disclosed. Although the embodiments have been described with reference to specific example embodiments, it will be evident that various modifications and changes may be made to these embodiments without departing from the broader spirit and scope of the claims.

Figure 1:
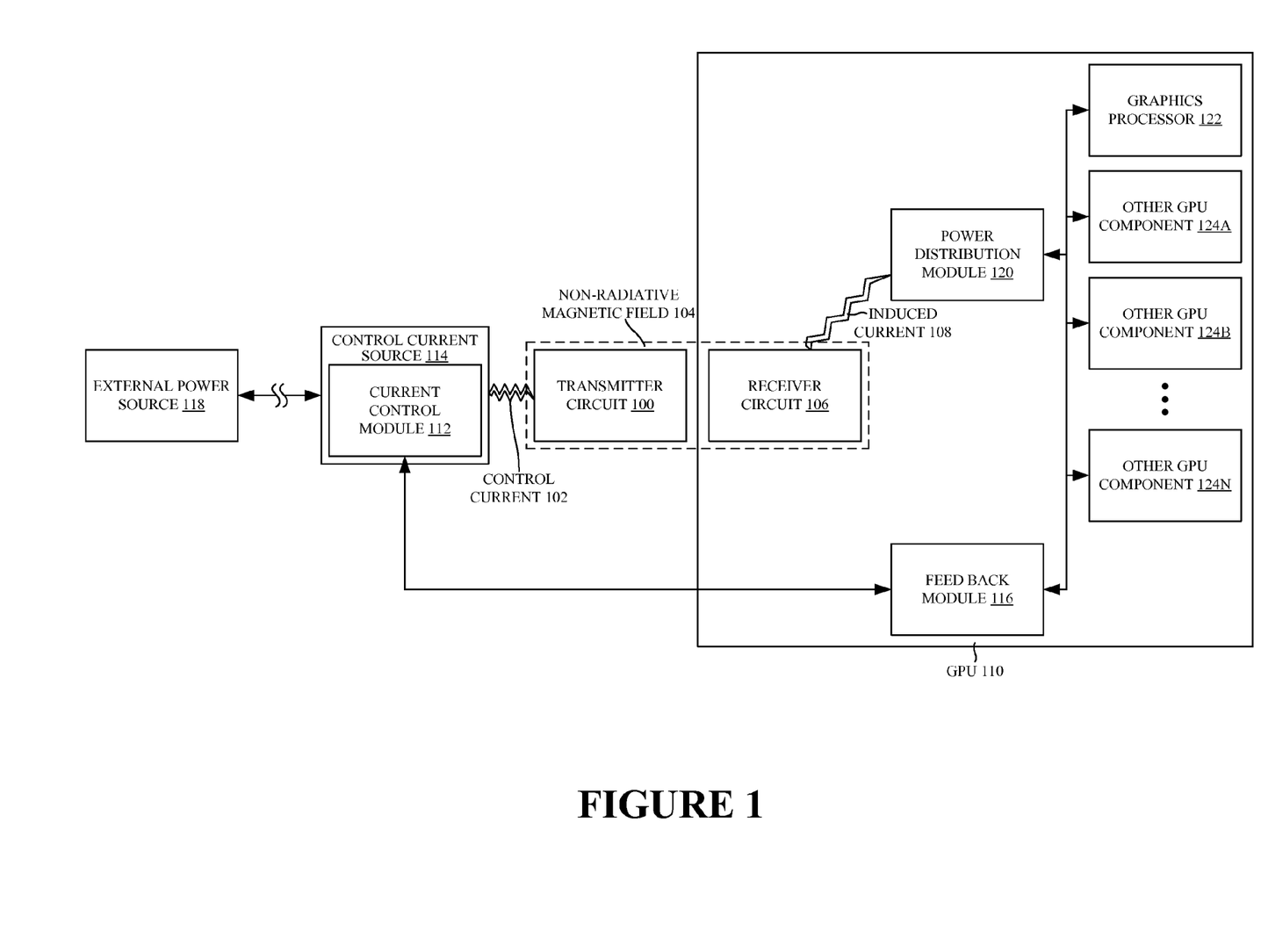
FIG. 1 shows a block diagram of a system of resonant induction to power a GPU, according to one embodiment.

FIG. 1 shows a system block diagram of a system of resonant induction to power a GPU 110, according to one embodiment. The transmitter circuit 100 is configured to a particular resonant frequency. The resonant frequency of the transmitter circuit 100 and the receiver circuit 106 is a function of the inductive properties and the capacitive properties of the transmitter circuit 100 as demonstrated by the example formula:

$$f = \frac{1}{2\pi\sqrt{L_T C_T}} = \frac{1}{2\pi\sqrt{L_R C_R}}$$

where, 'f' is the resonant frequency of the transmitter circuit 100 and the receiver circuit 106. '$L_T$' is the inductance of the transmitter circuit 100. '$C_T$' is the capacitance of the transmitter circuit 100. '$L_R$' is the inductance of the receiver circuit 106. '$C_R$' is the capacitance of the receiver circuit 106.

The inductance of the transmitter circuit 100 may also be directly proportional to the amount of control current 102 flowing through the transmitter circuit 100. Thus, the resonant frequency of the transmitter circuit 100 may be a function of the structural design of the transmitter circuit 100. The resonant frequency of the transmitter circuit 100 may also be a function of the value of the control current 102. In one embodiment, the transmitter circuit 100 may be designed to compensate for an increase in the value of the control current 102 while maintaining a constant resonant frequency. For example, certain structural elements of the transmitter circuit 100 may be mechanically manipulated to modify the value of the capacitance, '$C_T$', in order to offset a change in the value of the inductance, '$L_T$', due to a change in the value of the control current 102.

The transmitter circuit 100 may generate a non-radiative magnetic field 104 when the control current is passed through the transmitter circuit 100. The non-radiative magnetic field 104 may mediate a power exchange between the transmitter circuit 100 and any other circuit with the same resonant frequency as the transmitter circuit. The non-radiative magnetic field 104 may oscillate at the same resonant frequency as the transmitter circuit 100. The receiver circuit 106 may also configured to the same resonant frequency as the transmitter circuit 100. Accordingly, the receiver circuit 106 may resonantly couple with the transmitter circuit 100 via the non-radiative magnetic field 104. As a result, the non-radiative magnetic field 104 may resonantly induce the induced current 108 in the receiver circuit 106. A substantial portion of the energy in the non-radiative magnetic field 104 that is not used to resonantly induce the induced current may remain in the vicinity of the transmitter circuit 100 instead of being radiated into the environment.

In one embodiment, the resonant frequency of the receiver circuit 106 may be a function of the structural design parameters of the receiver circuit 106. For example, the receiver circuit may be a single-layer solenoid with closely spaced capacitor plates on each end. The design and materials of the single-layer solenoid and capacitor plates may be modified in order to achieve a resonant frequency that is equal to the resonant frequency of the transmitter circuit 100. In other embodiments, the resonant frequency of the receiver circuit 106 can be a function of other factors that modify the inductive and capacitive values of the resonant circuit.

The receiver circuit 106 may be located both within range of the non-radiative magnetic field 104 and within the GPU 110. Consequently, the design parameters of the receiver circuit 106 may be configured to allow the receiver circuit 106 to operate within the environment of the GPU 110. For example, the receiver circuit 106 may communicate the induced current 108 to a power distribution module 120 of the GPU 110. The power distribution module 120 may then distribute the induced current 108 to the graphics processor 122, the feedback module 116, and the other GPU components 124A-N according to their respective power requirements. In one embodiment, the power distribution module 120 may also remove excess induced current and distribute only the required level of current to drive the GPU 110.

The GPU 110 may include a graphics processor designed to render graphics applications in a computer system. An example GPU 110 includes the NVIDIA® Tesla™ GPU.

In one embodiment, the feedback module 116 may be located within the GPU 110. The feedback module may determine a power requirement of the GPU 110 by analyzing the power requirements of the applications currently run on the GPU 110. The feedback module 116 may then communicate the power requirement of the GPU 110 to a current control module 112 of the control current source 114.

The control current source 114 may be configured to electrically couple to an external power source 118. In one embodiment, the control current source 114 may be a switched-mode power supply configured within a computer system that includes the GPU 110. The current control module 112 may set the value of the control current 102 according the power requirement of the GPU 110. In one embodiment, the value of the control current 102 may be directly proportional to the value of the electromotive force of the non-radiative magnetic field 104 generated by the transmitter circuit 100. In this way, the power mediated by the non-radiative magnetic field 104 between the resonantly coupled transmitter circuit 100 and receiver circuit 106 can be varied by the current control module 112. The current control module 112 may also modify the waveform of the control current from a sinusoidal waveform into a rectangular or transient waveform in order to generate the non-radiative magnetic field 104.

In other embodiments, other methods may be employed to vary the power mediated by the non-radiative magnetic field 104. For example, the power transfer between the resonantly coupled transmitter circuit 100 and receiver circuit 106 may also a function of the distance between the two coils. Consequently, the location of the GPU 110 with respect to the transmitter circuit may be mechanically adjusted in order to vary the power transfer according to the power requirements of the GPU 110.

An example of the operation of the system of FIG. 1 is now described, according one embodiment. In this particular example embodiment, the GPU 110 is instructed to operate in idle mode. The particular GPU 110 of the example embodiment may consume a constant input of 90 W of power when operating in idle mode. The feedback module 116 may determine that an induced current 108 value of 7.5A is required to maintain the input power rate of 90 W. The feedback module may communicate the induced current requirement of 7.5A to the current control module 112. The current control module 112 may provide a control current 102 sufficient to cause the transmitter circuit 100 to generate a non-radiative magnetic field 104 capable of resonantly inducing an induced current 108 of 7.5A in the receiver circuit 106. The power distribution module 120 may remove any excess current when an induced current 108 of greater than 7.5A is resonantly induced in the receiver circuit 106. The power distribution module 120 may then communicate the induced current 108 of 7.5A to the components of the GPU 110.

In this particular example embodiment, the transmitter circuit 100 comprises a single-layer solenoid with closely spaced capacitor plates on each end. The distance between the capacitor plates can be mechanically adjusted to modify the capacitance of the transmitter circuit 100. Modifying the capacitance value may offset the change in the inductance value due to a change in the value of the control current 102. Thus, the resonant frequency of the transmitter circuit 100 can be maintained at a constant value.

In other embodiments, the feedback module 116 may also determine a new resonant frequency of operation for both the transmitter circuit 100 and the receiver circuit 106. Both the transmitter circuit 100 and the receiver circuit 106 may then be mechanically adjusted to resonate at the new resonant frequency.

In yet other embodiments, the GPU 110 may include more than one receiver circuit. Each receiver circuit may be tuned to the same resonant frequency. In this way, multiple parallel induced currents may be induced at the same time.

Figure 2:
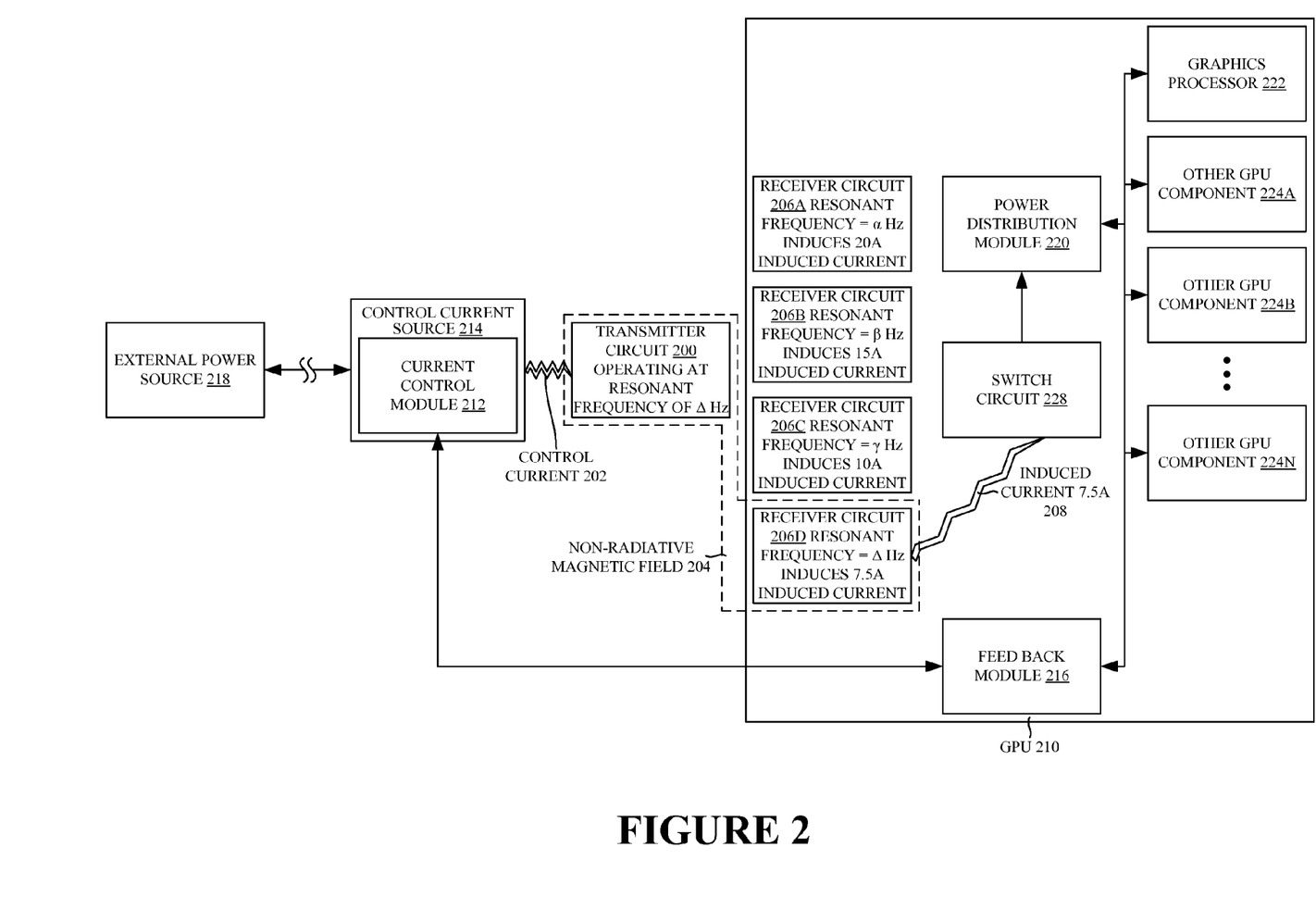
FIG. 2 shows a block diagram a system of resonant induction to power a GPU capable of operating in a range of resonant frequencies, according to another embodiment.

FIG. 2 shows a system block diagram of a system of resonant induction to power a GPU 210 capable of operating in a range of resonant frequencies, according to one embodiment. The transmitter circuit 200 may be configured to a resonant frequency of $\Delta$ Hz. The transmitter circuit 200 may generate a non-radiative magnetic field 204 when the control current 202 is passed through the transmitter circuit 200. The generated non-radiative magnetic field 204 oscillates at $\Delta$ Hz. Consequently, the non-radiative magnetic field 204 may mediate a power exchange between the transmitter circuit 200 and any other circuit with a resonant frequency of $\Delta$ Hz.

In the example embodiment of FIG. 2, the GPU 210 includes four receiver circuits 206A-206D. Each receiver circuit 206A-D may resonate at a particular fixed resonant frequency. Receiver circuit 206A may resonate at $\alpha$ Hz. Receiver circuit 206B may resonate at $\beta$ Hz. Receiver circuit 206C may resonate at $\gamma$ Hz. Receiver circuit 206D may resonate at and $\Delta$ Hz. Accordingly, receiver circuit 206D resonates when coupled with the non-radiative magnetic field 204 both may have a resonant frequency of $\Delta$ Hz. The non-radiative magnetic field 204 resonantly may induce an induced current 208 in the receiver circuit 206D. However, a current may not induced in the receiver circuits 206A-206C due to a lack of resonant coupling between each of the receiver circuits 206A-206C and the non-radiative magnetic field 204.

In the example embodiment, the resonant inductive power supply may be designed so that the value of the induced current is a function of the magnitude of the control current 202. Each of the receiver circuits 206A-206D may be preset to a specified induced current value that corresponds to a particular resonant frequency. The current control module 212 may set the magnitude of the control current 202. The current control module 212 may also modify the waveform of the control current from a sinusoidal waveform into a rectangular or transient waveform in order to generate the non-radiative magnetic field 204.

The switch circuit 228 may determine that the receiver circuit 206D is generating an induced current of 7.5A 208. The switch circuit 228 may then electrically couple with the receiver circuit 206D. The switch circuit 228 may then communicate the induced current 208 from the receiver circuit 206D to the power distribution module 220. The power distribution module 220 may then distribute the induced current of 7.5A 208 to the graphics processor 222 and the other GPU components 224A-N according to the particular power requirement of the particular component. The feedback module 216 may determine a power requirement of the GPU 210 and may communicate the power requirement to the control current module 212.

Figure 3:
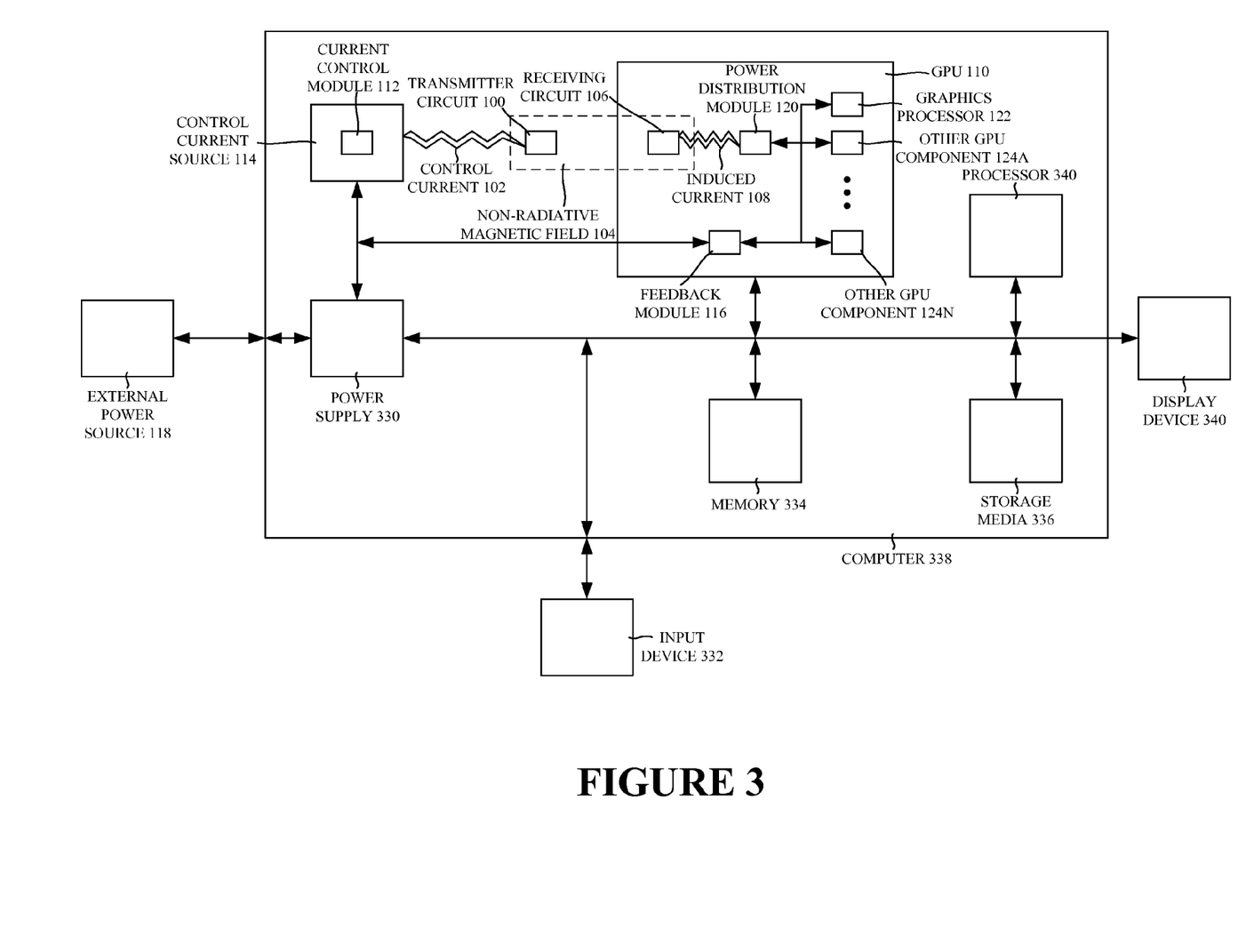
FIG. 3 shows a block diagram of a computer including a resonant induction to power a GPU, according to one embodiment.

FIG. 3 shows a system block diagram of a computer 342 including a system of resonant induction to power a GPU. The power source 118 may be an electrical power source configured to provide an alternating current to the power supply 330. The power supply 330 may convert the alternating current of the power source 118 to a direct current. The power supply 330 may provide the direct current to the control current source 114, the GPU 110, the memory 334, the storage media 336, and the processor 340. In an example embodiment, a user may input data and instructions regarding a computer graphics application through the input device 332. The GPU 110 may process the computer graphics application. The feedback module 116 may set the control current value according to the power requirement of the computer graphics application. The feedback module 116 may update the memory 334 to include the control current value associated with the computer graphics application. The feedback module 116 may construct a database index in the memory 334. The database index may associate various control current values with various computer graphics applications processed by the GPU 110.

The resonant frequency of the transmitter circuit 100 and/or the receiver circuit 106 may need to be modified according to the control current value. The storage media 336 may include a set of instructions to cause the processor 340 to carry out an operation to modify the capacitance of a capacitor of the transmitter circuit 100 and/or the receiver circuit 106. The feedback module 116 may cause the processor 340 to retrieve the set of instructions from the storage media 336. The display device 338 may convey the graphics information of the computer graphics application processed by the GPU 110.

Figure 4:
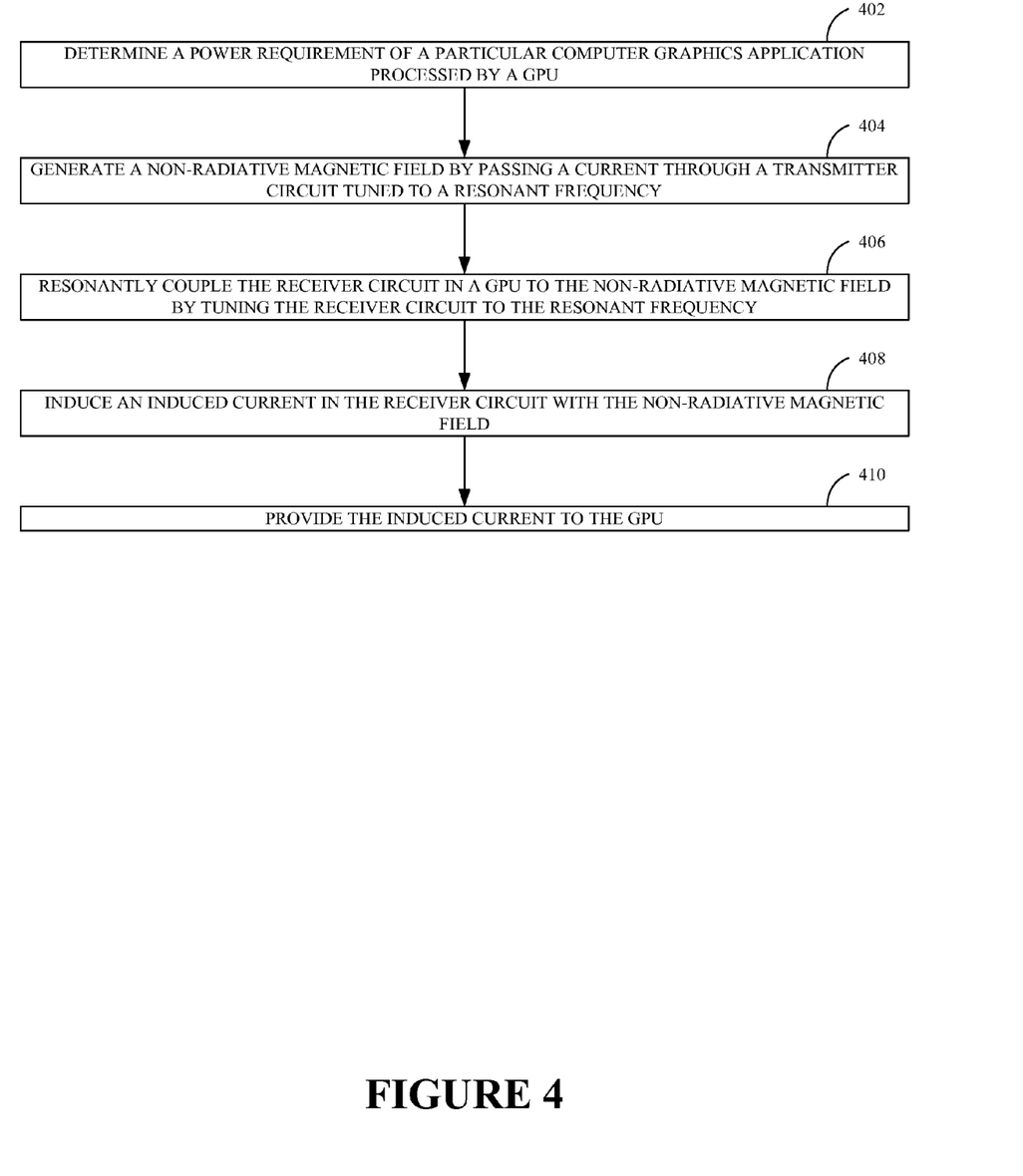
FIG. 4 is a processes flow illustrating inducing a current in a receiver circuit through a non-radiative magnetic field, according to one embodiment.

FIG. 4 is a process flow illustrating resonantly inducing an induced current 108 in the receiver circuit 106 through a non-radiative magnetic field 104, according to one embodiment. In operation 402, a power requirement of a particular computer graphics application processed by a GPU 110 may be determined. In operation 404, a non-radiative magnetic field 104 may be generated by passing a control current 102 through a transmitter circuit 100 tuned to a resonant frequency. The control current 102 may generate a non-radiative magnetic field 104 capable of mediating the power requirement to a receiver circuit 106. In operation 406, the receiver circuit 106 in the GPU 110 may be resonantly coupled to the non-radiative magnetic field 104 by tuning the receiver circuit 106 to the resonant frequency. In operation 408, an induced current 108 may be resonantly induced in the receiver circuit 106 by the non-radiative magnetic field 104. In operation 410, the induced current 108 may be provided to the GPU 110. The elements of FIG. 1 may be implemented to perform the operations of FIG. 4.

Figure 5:
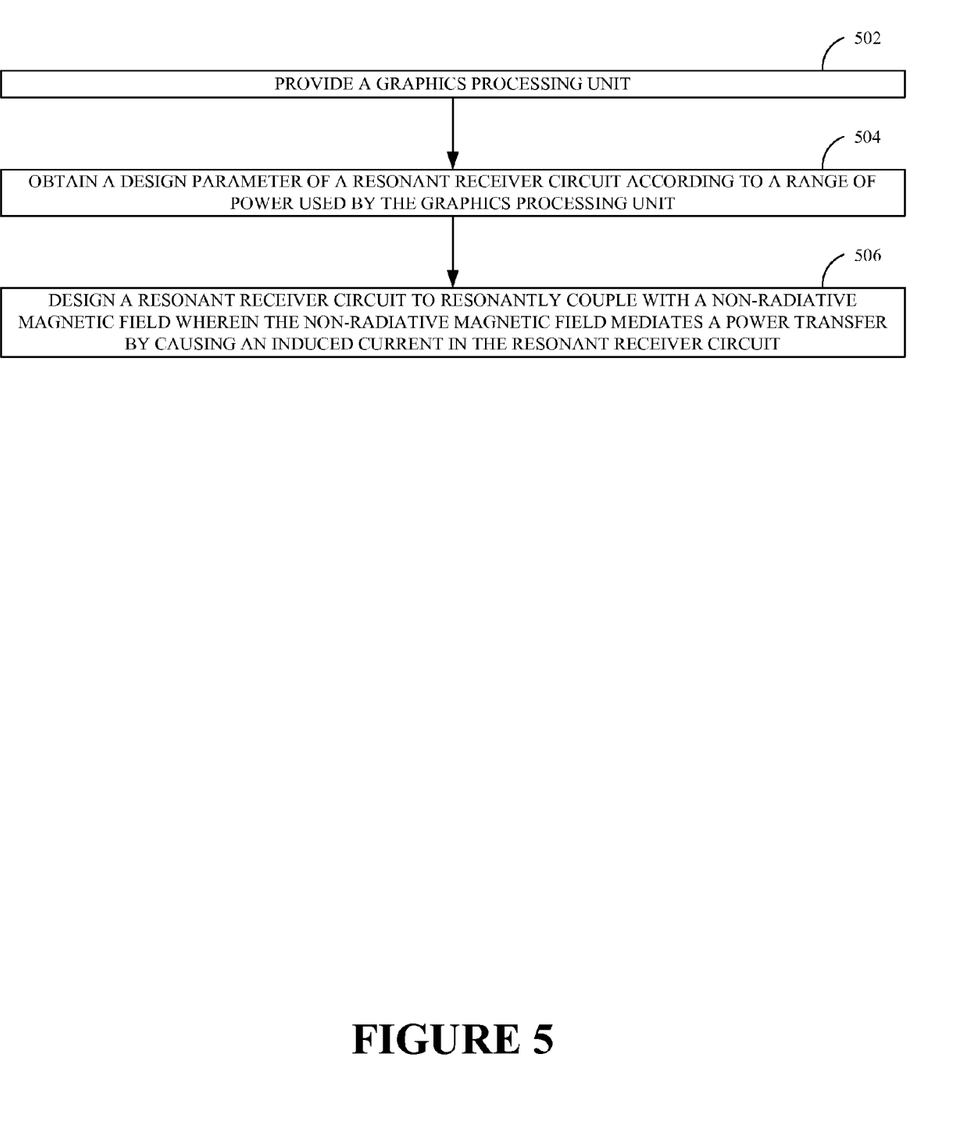
FIG. 5 is a process flow that illustrates designing a resonant receiver circuit to operate as a resonant inductive power supply of a GPU, according to one embodiment.

FIG. 5 is a process flow that illustrates designing a resonant receiver circuit (e.g. the receiver circuit 106) to operate as a resonant inductive power supply of a GPU 110, according to one embodiment. In operation 502, a GPU 110 is provided. In operation 504, a design parameter may be obtained according to a range of power used by the GPU 110. In operation 506, the resonant receiver circuit may be designed to resonantly couple with the non-radiative magnetic field 104. Operations 502-506 may be used to design the receiver circuit 106 of FIG. 1.

Although the present embodiments have been described with reference to specific example embodiments, it will be evident that various modifications and changes may be made to these embodiments without departing from the broader spirit and scope of the various embodiments. For example, the various embodiments described herein may be enabled and operated using hardware circuitry (e.g., CMOS based logic circuitry), firmware, software or any combination of hardware, firmware, or software (e.g., embodied in a machine readable medium). For example, the various electrical structure and methods may be embodied using transistors, logic gates, and electrical circuits (e.g., application specific integrated (ASIC) circuitry or in Digital Signal Processor (DSP) circuitry).

Particularly, the feedback module 116, and the other GPU components 124A-N of FIG. 1 may be enabled using software and using transistors, logic gates, and electrical circuits (e.g., application specific integrated ASIC circuitry) such as an a feedback circuit, another GPU circuit and other circuits.

In addition, it will be appreciated that the various operations, processes, and methods disclosed herein may be embodied in a machine-readable medium or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A resonant induction system comprising:
a transmitter circuit tuned to a resonant frequency, wherein the transmitter circuit generates a non-radiative magnetic field when a control current is passed through the transmitter circuit;
a receiver circuit, resonantly coupled to the non-radiative magnetic field generated by the transmitter circuit, and tuned to the resonant frequency of the transmitter circuit, wherein the receiver circuit is located in a graphics processing unit, and wherein the transmitter circuit and the receiver circuit are resonantly coupled to each other at the resonant frequency;
a control current source to supply the control current to the transmitter circuit;
a feedback module communicatively coupled to the graphics processing unit to determine a power requirement of the graphics processing unit while executing a computer graphics application; and
a current control module communicatively coupled to the feedback module to set the control current value according to the power requirement provided by the feedback module, the resonant frequency of the transmitter circuit and the receiver circuit being related according to the equation:

$$f = \frac{1}{2\pi\sqrt{L_T C_T}} = \frac{1}{2\pi\sqrt{L_R C_R}},$$

wherein 'f' is the resonant frequency, wherein '$L_T$' is a transmitter circuit inductance, wherein '$C_T$' is a transmitter circuit capacitance, wherein '$T_R$' is a receiver circuit inductance, and wherein '$C_R$' is a receiver circuit capacitance.

2. The resonant induction system of claim 1, wherein the receiver circuit provides an induced current to the graphics processing unit.

3. The resonant induction system of claim 1, wherein the receiver circuit comprises a single-layer solenoid and a capacitor, wherein the capacitance of the capacitor is mechanically modified to tune the receiver circuit to the resonant frequency.

4. The resonant induction system of claim 3, wherein the transmitter circuit modifies the resonant frequency of the non-radiative magnetic field according to a control current value.

5. The resonant induction system of claim 1 further comprising:
a plurality of receiver circuits resonantly coupled to the non-radiative magnetic field, wherein each receiver circuit resonates at a different resonant frequency.

6. The resonant induction system of claim 5, further comprising:
a switch circuit of the graphics processing unit to couple a particular receiver circuit of the plurality of receiver circuits to a particular component of the graphics processing unit as a function of the power requirement of the particular computer graphics application.

7. The resonant induction system of claim 1, wherein the current control module modifies the waveform of the control current to at least one of a rectangular waveform and transient waveform.

8. A graphics processing unit comprising:
a graphics processor;
a plurality of receiver circuits each designed to resonantly couple with a non-radiative magnetic field at a different resonant frequency, and to provide an induced current;
a power distribution module to distribute the induced current to the graphics processor;
a feedback module to determine a power requirement of the graphics processor, the feedback module rendering a signal comprising an information of the power requirement of the graphics processing unit; and
a switch circuit to communicatively couple with a particular receiver circuit of the plurality of receiver circuits according to the different resonant frequency, wherein the switch circuit receives the induced current from the particular receiver circuit.

9. The graphics processing unit of claim 8, wherein the particular receiver circuit comprises at least one capacitor.

10. The graphics processing unit of claim 9, wherein a capacitance of the at least one capacitor is varied to modulate a receiver circuit resonant frequency according to a non-radiative magnetic field resonant frequency.

11. A method comprising:
providing a graphics processing unit;
obtaining a design parameter of a receiver circuit according to a range of power used by a graphics processing unit;
coupling a resonant receiver circuit with a non-radiative magnetic field, wherein the non-radiative magnetic field mediates a power transfer by causing an induced current in the resonant receiver circuit;

determining a power requirement of the graphics processing unit while executing a computer graphics application; and controlling the induced current according to the determined power requirement, a resonant frequency of the non-radiative magnetic field with reference to a transmitter circuit and the resonant receiver circuit being related according to the equation:

$$f = \frac{1}{2\pi\sqrt{L_T C_T}} = \frac{1}{2\pi\sqrt{L_R C_R}},$$

wherein 'f' is the resonant frequency, wherein '$L_T$' is a transmitter circuit inductance, wherein '$C_T$' is a transmitter circuit capacitance, wherein '$L_R$' is a resonant receiver circuit inductance, and wherein '$C_R$' is a resonant receiver circuit capacitance.

12. The method of claim 11, further comprising,
obtaining a solenoid design parameter of a single-layer solenoid of the resonant receiver circuit to resonantly couple the resonant receiver circuit to the non-radiative magnetic field.

13. The method of claim 11, further comprising:
obtaining a capacitor design parameter of a capacitor of the resonant receiver circuit to resonantly couple the resonant receiver circuit to the non-radiative magnetic field.

* * * * *